United States Patent Office 2,954,352
Patented Sept. 27, 1960

2,954,352
COMPOSITION COMPRISING CELLULOSE TRIACETATE AND A POLYOXAMIDE

Victor Francis George Cooke and James Wotherspoon Fisher, Putteridge Bury, near Luton, England, assignors to British Celanese Limited, a corporation of Great Britain No Drawing. Filed Nov. 21, 1957, Ser. No. 697,796

Claims priority, application Great Britain Dec. 28, 1956

1 Claim. (Cl. 260—13)

This invention relates to compositions comprising organic derivatives of cellulose and to articles made from these compositions.

The novel compositions of the invention comprise an organic derivative of cellulose which is soluble in methylene chloride, and also a high linear polyoxamide in which a substantial proportion (i.e. 30% or more), and preferably all, of the repeating units of the polymer contain a tertiary amino-nitrogen atom in the chain. (For the sake of brevity the term "the specified polyoxamides" will be used hereinafter to denote high linear polyoxamides of this kind.) The compositions may also contain other components, for example a common solvent for the cellulose derivative and the polyoxamide, and effect materials, e.g. inorganic and organic pigments and other delustring or colouring agents.

The invention is of particular value in connection with cellulose acetates of both the so-called "acetone-soluble" type (which usually have an acetyl value, reckoned as acetic acid, of about 52–56.5%) and the "triacetate" type (having an acetyl value above 59% and preferably above 60%). It may however also be applied to other cellulose acetates of lower or intermediate acetyl value, and to cellulose esters of other organic acids, especially cellulose propionates, butyrates, acetate propionates and acetate butyrates, which are soluble in methylene chloride. Moreover it may be applied to cellulose ethers which are soluble in methylene chloride, for example ethyl cellulose having an ethoxyl content in the region of 45–50%.

Since it appears likely that the main value of the invention will in practice lie in its use to modify the properties of textile and other articles made of a cellulose acetate, it will be convenient now in describing it in more detail to refer particularly to these esters.

The polyoxamides which are employed in accordance with the invention are preferably derived from oxalic acid and a bis-(ω-aminopolymethylene)-alkylamine in which the polymethylene groups preferably each contain 2–6 carbon atoms, especially a bis-(3-aminopropyl)-alkylamine, in which the alkyl group contain 1–3 carbon atoms, and may be regarded as having the structure (neglecting the end groups)

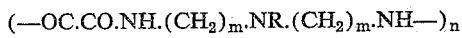
(—OC.CO.NH.(CH$_2$)$_m$.NR.(CH$_2$)$_m$.NH—)$_n$ where R is methyl, ethyl, propyl or isopropyl and $m$ is an integer preferably between 2 and 6 inclusive, and $n$ is a much higher integer. Examples of other bis-(ω-aminopolymethylene)-alkylamines falling within this class are bis-(2 - aminoethyl)-methylamine, bis-(5-aminopentyl)-methylamine, and the corresponding compounds in which the alkyl group on the tertiary nitrogen atom contains 2 or 3 carbon atoms. Corresponding polyoxamides in which R is an alkyl group containing 4 or more carbon atoms are in general less useful, and in any case are more difficult to obtain, as are those in which R is a cycloalkyl group such as cyclohexyl, or an aromatic group such as phenyl or benzyl. If desired the amine component of the polyoxamide may possess one or more C-substituents, e.g. methyl groups, but this is not as a rule very desirable. Preferably the polyoxamides have an intrinsic viscosity of at least 0.25, and especially 0.4 or higher, e.g. up to about 1.1, as determined in a 1% solution in m-cresol at 20° C.

If desired there may be used mixed polyoxamides derived from oxalic acid and two or more different amine components, of which one at least contains a teriary nitrogen atom in the chain, e.g. bis-(3-aminopropyl)-alkylamine and a bis-(2 - aminoethyl)-alkylamine or, among diamines containing no tertiary amino group, hexamethylene diamine. However for the purpose of the present invention these mixed polyoxamides are less advantageous than those derived from oxalic acid and a single bis-(ω-aminopolymethylene)-alkylamine of the class described.

One method of making the specified polyoxamides is to heat together diethyl oxalate or another oxalic acid diester and the appropriate bis-(3-aminopropyl)-alkylamine or other amine component in approximately equimolecular proportions under conditions such as are ordinarily used in the production of high linear polyamides. For example they may be heated in a non-oxidising atmosphere to about 170°–220° C. or higher, at first under atmospheric pressure but later on advantageously under a reduced pressure, for example between about 0.5 and 5 mm. of mercury. In a preferred method the oxalic acid diester and the amine component are allowed to react in a liquid reaction medium, especially one in which both reactants are dissolved but in which the polyoxamide formed is insoluble; ethanol and other lower aliphatic alcohols are particularly useful for this purpose. This method of working permits easier temperature control of the exothermic poly-condensation reaction, and also has the further advantage, from the point of view of the present invention, that the polyoxamides can be obtained in a form in which they are very easily disintegrated to give a product which both dissolves quickly, and is readily intimately mixed as a solid with the cellulose acetate. The process can be carried out in various ways; for example solutions of the two reactants, either at the same or different temperatures, may be mixed, or one or other of the reactants, preferably in a finely divided form or, as in the case of diethyl oxalate, as a liquid, added to a solution of the other. Thus an ethanolic solution of the amine component at about room temperature or above may be mixed with a hot or boiling solution of diethyl oxalate. Preferably the reaction is carried out under reflux, vaporised solvent being returned to the reaction zone. In many cases the polyoxamide that separates out has already a sufficiently high intrinsic viscosity, but if it has not, it may be heated further, preferably above its melting point and in any case to a fairly high temperature, e.g. above about 150° C., if necessary after separating it from the solvent.

The bis-(3-aminopropyl)-alkylamines may themselves be made by the reaction of two molecular proportions of acrylonitrile and one molecular proportion of a monoalkylamine followed by hydrogenation of the product. The reaction between the acrylonitrile and the monoamine proceeds very easily when the amine contains up to 3 carbon atoms, and more or less quantitative yields can be obtained. When the alkyl groups become larger however the reaction sometimes becomes more difficult. Similarly the bis-(5-aminopentyl)-alkylamines can be made by hydrogenating the adduct of two molecular proportions of 1-cyanobutene-2 and one molecular proportion of a mono-alkylamine.

It is usually preferable that the relative proportions of the cellulose acetate and the polyoxamide in the composition should be within the limits of compatibility, in the sense that even in the absence of a common solvent the composition is homogeneous. The maximum proportion of a polyoxamide derived from a bis(3-aminopropyl)-alkylamine in which the alkyl group contains 1–3 carbon atoms is generally about 15% (on the total weight of the two solids) with cellulose triacetate, and about 25% with acetone-soluble cellulose acetates. Since the advantages of the invention are generally secured by the use of considerably smaller proportions of the polyoxamides, viz. between about 1 and 10% (on the same basis), these compatibilities are in practice more than sufficient for most purposes.

The compositions of the invention find their chief application in the manufacture of textile products and films, foils and the like, though they can also provide moulding powders and coating compositions, and find other "plastics" applications.

Filamentary material, such for example as continuous filament yarns, tows which are intended for cutting into staple lengths, and bristles, can be made either by dry- or wet-spinning methods from solutions of the cellulose acetate and polyoxamide, or by melt spinning a composition which is substantially free from solvent. For example, they can be dry spun from solutions in methylene chloride or ethylene chloride, or better in a mixture of methylene of ethylene chloride and a minor porportion of a lower aliphatic alcohol (i.e. one containing up to 4 carbon atoms in the molecule), mixtures containing between about 84 and 96% by weight of methylene chloride and between about 4 and 16% of methanol being particularly useful. On the other hand they can be wet spun from the same solvents into coagulating baths comprising a low aliphatic alcohol and advantageously also a certain amount of the chlorinated hydrocarbon solvent employed in the spinning solution. Melt spinning of solvent-free compositions can for example be carried out by a method, or using apparatus, described in U.S. applications S. Nos. 243,994, filed August 28, 1951, now abandoned, 462,746, filed September 18, 1954, now abandoned, 292,-772, filed June 10, 1952 now U.S. Patent 2,888,711 and 423,743, filed March 16, 1954, and in U.S. Patent Nos. 2,831,748, issued April 22, 1958, 2,838,793, issued June 17, 1958 and 2,839,784, issued June 24, 1958. Films, foils and the like may be obtained by casting methods from solution in the same solvents, setting being effected either by evaporating the solvent or by a wet process using for instance an alcoholic coagulating bath.

One advantage of the invention is that it provides a method of greatly reducing the trouble known as "gas fading," which is observed with cellulose acetate textile articles dyed with many disperse dyes. This type of fading, which is believed to be caused by the presence in the atmosphere of oxides of nitrogen, has in the past been very difficult to prevent. Now however it has been found that the presence in the cellulose acetate articles of as little as 1% of their weight of a polyoxamide derived from oxalic acid and bis-(3-aminopropyl)-methylamine can cause a very valuable increase in the resistance of the dyed material to this kind of fading, while an even greater degree of protection is afforded by proportions of the polyoxamide above 3%, and especially above 4%. The bis-(3-aminopropyl)-methylamine can of course be replaced by another of the specified polyoxamides.

Another advantage of the invention relates to the use of certain water-soluble dyes for colouring cellulose acetate materials. A number of water-soluble dyes are known which are useful for dyeing materials of acetone-soluble cellulose acetate, though not as a rule cellulose triacetate materials. These dyes are usually acid sulphates of dyes which contain one, and only one, hydroxyl group attached directly to an alkyl group; examples are Solway Ultra Blue BS, Solacet Fast Yellow WGRS, Solacet Fast Orange WRS, Solacet Fast Scarlet WBS, Solacet Crimson WBS, Solacet Fast Blue WGK, and Solacet Fast Green 2GS. While these dyes can be used for dyeing materials consisting solely of acetone-soluble cellulose acetate, the incorporation in the cellulose acetate of about 1% or more of the polyoxamide derived from oxalic acid and bis-(3-aminopropyl)-methylamine or another of the specified polyoxamides considerably increases the affinity of the material for the dye; furthermore, although the dyes are virtually useless for dyeing materials consisting of cellulose triacetate only, they will dye cellulose triacetate materials containing one of these polyoxamides; the depth of shade obtainable depends to some extent on the proportion of the polyoxamide in the material, light shades being obtainable with as little as 1% of for example the polyoxamide derived from oxalic acid and bis-(3-aminopropyl)-methylamine, while for fuller shades 2.5% or more of the polyoxamide should be present.

The specified polyoxamides also have a very useful plasticising effect on the cellulose acetates, and this is advantageous not only when the compositions are used for the manufacture of films, foils or the like for which the presence of a plasticiser is usually desirable, but also when the compositions are to be melt spun by the processes referred to above. The specified polyoxamides have the advantage over most of the compounds heretofore used to plasticise cellulose acetates, especially cellulose triacetates, that they do not tend to migrate towards the surface of an article, but remain uniformly distributed.

While as has already been stated it is usually desirable to maintain the relative proportions of cellulose acetate and polyoxamide within the compatibility limits, special effects can be obtained by using higher proportions of polyoxamide such that the articles produced are heterogeneous in structure. For example yarns produced from compositions in which the proportion of polyoxamide is above the compatibility limit can be given a useful degree of crimp by simple treatments such for example as steaming and scouring with hot water.

The invention is further illustrated by the following examples; except where otherwise indicated the "parts" and proportions are by weight.

*Example I*

Equimolecular proportions of diethyl oxalate and bis-(3-aminopropyl)-methylamine were mixed together at room temperature in an atmosphere of dry nitrogen, and the mixture was then heated to 205° C. for 1½ hours at atmospheric pressure followed by 0.75 hours at 1 mm. pressure. The polymer produced was microcrystalline in structure and had a melting point of 168–170° C. and an intrinsic viscosity of 0.71.

*Example II*

Equimolecular proportions of diethyl oxalate and bis-(3-aminopropyl)-isopropylamine were mixed together at room temperature, and the mixture was then heated under dry nitrogen to 180° C. for 1.75 hours under atmospheric pressure and for a further 1.5 hours under a pressure of 1 mm. of mercury. The polymer formed solidified on cooling to a clear, almost colourless glass which began to soften at 130° C. and had an intrinsic viscosity of 0.70.

*Example III*

Solutions of equimolecular proportions of diethyl oxalate and bis-(3-aminopropyl)-methylamine, the first in twice its volume and the second in twice its weight of ethanol, were mixed together under reflux, and the resulting solution kept boiling until after a few minutes it had set to a gel. The gel was broken up, and heated to drive off the ethanol. In some cases the polyoxamide produced at this stage already had an intrinsic viscosity of about 0.7; in others its intrinsic viscosity was between 0.5 and 0.7 but could be raised to 0.7 (or higher if this was desired) by heating the polymer in an inert atmosphere to about 200° C. for 2–3 hours or less. In all cases the polyoxamide finally obtained was friable and could readily be ground to a fine powder.

Example IV

A mixture of 95 parts of either an acetone-soluble cellulose acetate, or a cellulose triacetate of acetyl value about 61% and 5 parts of the polyoxamide of intrinsic viscosity about 0.7 produced in accordance with Example III were dissolved in a mixture of methylene chloride (90%) and methanol (10%) to give solutions of total solids concentration 20%. Filaments were formed from these solutions by dry spinning in the usual way. Not only the acetone-soluble cellulose acetate filaments, but also those of cellulose triacetate, could be dyed to medium-full shades with Solacet Fast Yellow WGRS, Solacet Fast Scarlet WBS, and other dyes of the "Solacet" series.

Example V

Filaments consisting of 97% of cellulose triacetate of acetyl value about 61% (reckoned as acetic acid) and 3% of a polyoxamide of intrinsic viscosity about 0.7 obtained as described in Example III, were made by dry spinning from solution in a mixture of methylene chloride (90%) and methanol (10%), and knitted into panels. These panels were then dyed with various water-soluble dyes of the Solacet series, which are not capable of satisfactorily dyeing materials consisting solely of cellulose triacetate. The results obtained are summarised in the following table.

| Dyestuff | Colouration produced |
|---|---|
| Solway Ultra Blue BS | Medium blue. |
| Solacet Fast Yellow WGRS | Full yellow. |
| Solacet Fast Orange WRS | Medium orange. |
| Solacet Fast Scarlet WBS | Full scarlet. |
| Solacet Fast Crimson WBS | Full wine. |
| Solacet Fast Blue WGK | Full blue. |
| Solacet Fast Green 2GS | Medium green. |

Example VI

Filaments containing 97% of cellulose triacetate and 3% of the polyoxamide obtained as described in Example I were made by dry spinning from methylene chloride/methanol 90/10, and samples were dyed with three disperse dyes which are known to be susceptible to gas fading, namely S.R.A. Brilliant Blue IV, Duranol Violet 2R, and Duranol Blue 2G. In all cases the colours produced were much more resistant to gas fading than the colours on 100% cellulose triacetate filaments dyed with the same dyes, and with the first two dyes they were also faster to light. When filaments containing 5% of the polyoxamide were dyed with the same dyes, their resistance to gas fading was even higher.

Example VII

Polyoxamides obtained as in Example II and Example III respectively were added to solutions of cellulose triacetate in methylene chloride in amount about 15% of the weight of the cellulose triacetate. The solutions were stirred to render them homogeneous, and were then poured into boiling water to precipitate the mixture of cellulose triacetate and the polyoxamide. The precipitate was ground and compressed into tablets and then formed into filaments by a melt spinning process in which the tablets were pressed against a heated jet plate as described in U.S. application Ser. No. 423,743, filed April 16, 1954. Good quality filaments were formed having dyeing properties similar to those of the products of Examples IV, V and VI.

Example VIII

A solution in methylene chloride/methanol 90/10 of cellulose triacetate and the polyoxamide obtained according to Example II, in which the total solids concentration was about 20%, and the relataive amounts of cellulose triacetate and the polyoxamide were 85% and 15%, was cast as a film onto a heated casting wheel in the usual way. The resulting film had good strength and flexibility.

Example IX 95 parts of an acetone-soluble cellulose acetate of acetyl value 55.6%, and 5 parts of a polyoxamide of intrinsic viscosity about 0.8 derived from oxalic acid and bis-(5-aminopentyl)-methylamine, were dissolved in methylene chloride/methanol 90/10 to give a solution of total solids concentration about 15%. A similar solution was made using a cellulose triacetate of acetyl value 61.0% in place of the acetone-soluble cellulose acetate. Both solutions were cast into films using an apparatus with the blade set at 0.020 inch. Good films were obtained in both cases.

While the invention has been described in the examples by reference to particular polyoxamides which have been found to be both very useful and relatively easily made, it will be understood that other polyoxamides containing tertiary amino-nitrogen atoms in the chain can be used in their place, though the proportions required to give a particular result may be different.

Having described our invention, what we desire to secure by Letters Patent is:

A composition containing from 99–85 percent by weight of cellulose triacetate of acetyl value at least 60 percent calculated as acetic acid and from 1–15 percent by weight of a polyoxamide derived from oxalic acid and at least one bis($\omega$-amino-polymethylene)-alkylamine having the general formula $$H_2N-(CH_2)_m-N(R)-(CH_2)_m-NH_2$$

in which R is an alkyl group selected from the group consisting of methyl, ethyl, propyl and isopropyl groups and $m$ is an integer between 2 and 6 inclusive, the intrinsic viscosity of said polyoxamide being in the range of 0.25 to 1.1, as determined in a 1% solution in m-cresol at 20° C.

References Cited in the file of this patent

UNITED STATES PATENTS

| 2,190,770 | Carothers | Feb. 20, 1940 |
| 2,311,548 | Jacobson et al. | Feb. 16, 1943 |
| 2,558,031 | Allen et al. | June 26, 1951 |